United States Patent
Szyperski (10) Patent No.: US 7,269,823 B2
(45) Date of Patent: Sep. 11, 2007

(54) SYSTEM AND METHOD FOR IDENTIFYING NAMESPACES

(75) Inventor: Clemens A. Szyperski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 426 days.

(21) Appl. No.: 09/997,057

(22) Filed: Nov. 29, 2001

(65) Prior Publication Data

US 2003/0101434 A1 May 29, 2003

(51) Int. Cl.
*G06F 9/44* (2006.01)
*G06F 9/45* (2006.01)

(52) U.S. Cl. .................... 717/123; 717/114; 717/120

(58) Field of Classification Search ........ 717/120–125, 717/101–103, 108, 116, 114; 707/201–203
See application file for complete search history.

(56) References Cited

U.S. PATENT DOCUMENTS

| | | | | |
|---|---|---|---|---|
| 5,689,701 A * | 11/1997 | Ault et al. | ..................... | 707/10 |
| 5,889,992 A * | 3/1999 | Koerber | ..................... | 717/108 |
| 6,083,282 A * | 7/2000 | Caron et al. | ................. | 717/101 |
| 6,249,313 B1 * | 6/2001 | Nishi | ..................... | 348/231.9 |
| 6,381,742 B2 * | 4/2002 | Forbes et al. | ................ | 717/176 |
| 6,467,081 B2 * | 10/2002 | Vaidyanathan et al. | ..... | 717/123 |
| 6,560,774 B1 * | 5/2003 | Gordon et al. | ............... | 717/146 |
| 6,598,052 B1 * | 7/2003 | Saulpaugh et al. | .......... | 707/102 |
| 6,611,844 B1 * | 8/2003 | Saulpaugh et al. | .......... | 707/100 |
| 6,625,804 B1 * | 9/2003 | Ringseth et al. | ............. | 717/114 |
| 6,691,119 B1 * | 2/2004 | Lippert et al. | ............... | 707/100 |
| 6,691,298 B1 * | 2/2004 | Russo et al. | ................. | 717/100 |
| 6,738,789 B2 * | 5/2004 | Multer et al. | ................ | 707/201 |
| 6,766,334 B1 * | 7/2004 | Kaler et al. | ................. | 707/203 |
| 6,889,158 B2 * | 5/2005 | Penov et al. | ................. | 702/119 |
| 6,920,461 B2 * | 7/2005 | Hejlsberg et al. | ........ | 707/103 R |
| 6,986,121 B1 * | 1/2006 | Boshier et al. | ............. | 717/108 |
| 7,073,123 B2 * | 7/2006 | Friedman et al. | ........... | 715/513 |
| 7,107,578 B1 * | 9/2006 | Alpern | ....................... | 717/124 |
| 7,114,148 B2 * | 9/2006 | Irving et al. | ................ | 717/121 |
| 7,140,004 B1 * | 11/2006 | Kunins et al. | .............. | 717/125 |
| 7,165,239 B2 * | 1/2007 | Hejlsberg et al. | ........... | 717/114 |
| 2002/0133809 A1 * | 9/2002 | Hills | ......................... | 717/136 |

OTHER PUBLICATIONS

Brett Mclaughlin, "Java & XML" 2nd edition, o''Reilly Pub. 2000, 2001.*

(Continued)

*Primary Examiner*—Anil Khatri
(74) *Attorney, Agent, or Firm*—Merchant & Gould P.C.; Ryan T. Grace (57) ABSTRACT

Described is a system and method that enable the incorporation of one namespace into another namespace while avoiding name collisions by defining namespaces with a common name and a unique identifier. In accordance with the invention, a namespace may incorporate another namespace by unique identifier and assign an alias to that incorporated namespace. The use of the alias provides a developer with the flexibility to reference the imported namespace and its declarations by common, understandable, or human-meaningful names. In addition, name collisions between the imported namespace and local declarations are avoided by the uniqueness provided by the unique identifier. Furthermore, by way of re-exports, multiple parallel namespace hierarchies can be formed over the same definitions to reflect multiple parallel taxonomies.

20 Claims, 5 Drawing Sheets

OTHER PUBLICATIONS

Komu et al, "Applying a cryptographic namespace to applications", ACM DIN, pp. 23-27, 2005.*

Ghazaleh et al, "Differential deserialization for optimized SOAP performance", IEEE, pp. 1-11, 2005.*

Cheney, "Towards a general theory of names, binding and scope", ACM MERLIN, pp. 33-40, 2005.*

Zhang et al, "Desiging a robust namespace for distributed file services", IEEE, pp. 162-171, 2001.*

* cited by examiner

```
                     300           303    301       305       307
                      ⌣             ⌢      ⌢         ⌢         ⌢
           NamespaceDef =      [soft] namespace [StandardName] GUID
                               {
                                       Import | Export | Definition
                               }, wherein,
309 ──    Import =      import [LocalName equal] [StandardName] GUID,
311 ──    Export =      export ExportName equal Name,
313 ──    Definition =  LeafDef₁ | ... | LeafDefₙ,
           LocalName = Name,
           ExportName = Name,
           StandardName = Name,
           Name =        atomic-name {dot atomic-name},
           GUID =        guid (guid).
```

SYSTEM AND METHOD FOR IDENTIFYING NAMESPACES

FIELD OF THE INVENTION

The present invention is directed at software development tools and software components, and more particularly to mechanisms for managing names within the software development tools in a manner that supports a stable evolution for the software components.

BACKGROUND OF THE INVENTION

During software development, developers spend considerable time reading their own code and reading code written by other developers. In fact, typically, developers spend more time reading code than actually writing code. When the developers write code, they typically define artifacts such as classes, attributes and methods using descriptive and readable names. These descriptive and readable names allow others, and themselves, to easily grasp the general idea of the code. For example, if the code is for an accounting program, a developer may conveniently name a class "Accounts Receivable."

While these descriptive and readable names allow others to easily grasp the general idea of the code, the names are often so common that they conflict with other artifacts having identical names. Because no two artifacts in the same scope can have the same name, names must be chosen carefully so that the names do not collide.

One approach for having unique names is by prefixing the name of the artifact (class, type, interface, etc.) with a company name, a product name or the like. This approach, however, results in very lengthy and cumbersome names. These lengthy and cumbersome names make it more difficult to write code. In addition, when trademarks or domain names are used, the prefixes do not provide a stable reference over a long period of time because the trademark or domain name may expire, may be sold or may otherwise undergo a change of ownership.

Another approach for having unique names is to assign a globally unique identifier (GUID) to each object. One disadvantage with this approach is that the GUID is not an easily readable name for humans and does not easily convey the general idea for the object or code. In addition, a GUID is lengthy and cumbersome to write.

Another approach is to include object definitions within a flat namespace (e.g., # includes in C). However, this approach does not avoid clashes during run-time and relies on a build system to initially resolve the conflicting names.

Currently, these approaches fall short of a naming mechanism that conveniently prevents names from clashing during the build process and during runtime.

SUMMARY OF THE INVENTION

The present invention provides a technique for naming namespaces that allows one namespace to be made available to another namespace without creating name collisions within the other namespace during the build process and at run-time while still allowing readable names to be used within each namespace. Generally stated, a namespace is defined by a readable name in conjunction with a unique namespace identifier, such as a Globally Unique Identifier (GUID). These defined namespaces may then be imported into other namespaces and locally renamed to any readable name, such as to an alias. Using the alias, locally written names can be kept as short as desired or otherwise written in any user-friendly fashion. However, since the imported namespace is also associated with a unique identifier, objects within the imported namespace may be referred to by common names without causing name collisions within the importing namespace. The namespace mechanism of the present invention allows exporting all or a portion of an imported namespace. This import/export mechanism enables the creation of namespace hierarchies. The namespace mechanism supports creation of arbitrary parallel namespace hierarchies that reflect multiple taxonomies. Importantly, the namespace mechanism uniquely identifies each namespace with an identifier, but allows referencing the namespace with a readable name.

The present invention provides a namespace mechanism that conveniently prevents name clashes during a build process and during run-time in a manner that remains stable and deterministic over time, even as ownership of the defined artifacts undergoes changes. One advantage of the namespace mechanism in accordance with the present invention is that the hierarchical grouping of definitions does not necessarily need to be unique. In fact, each individual developer may determine the hierarchical grouping. In addition, these individualized hierarchical groupings will not conflict with each other.

Another advantage of the present invention is that the resolution of names will not depend solely on the location of the source code. For example, currently, build systems implement a search-path strategy for resolving names. Thus, if one source module is moved, the names associated with the source module may not be resolved correctly.

DETAILED DESCRIPTION OF THE PREFERRED EMBODIMENT

Briefly stated, the present invention enables the incorporation of one namespace into another namespace while avoiding name collisions by defining namespaces with a common name and a unique identifier. In accordance with the invention, a namespace may incorporate another namespace by unique identifier and assign an alias to that incorporated namespace. The use of the alias provides a developer with the flexibility to reference the imported namespace and its declarations by common, understandable, or human-meaningful names. In addition, name collisions between the imported namespace and local declarations are avoided by the uniqueness provided by the unique identifier. These and other aspects of the invention will become apparent to those skilled in the art from the following detailed description.

Illustrative Operating Environment

Figure 1:
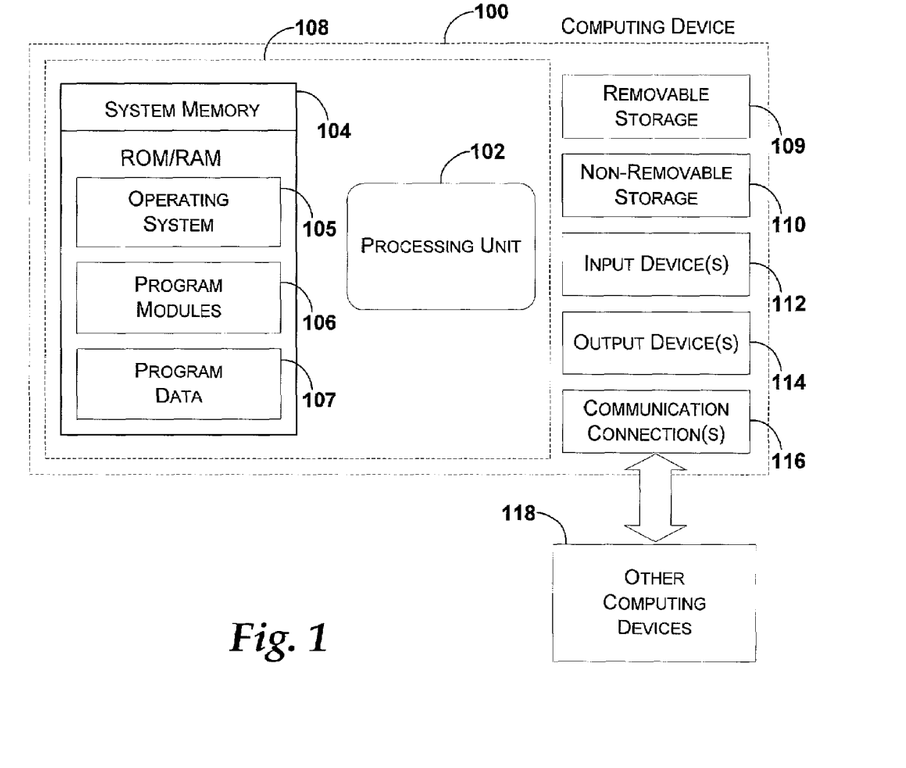
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
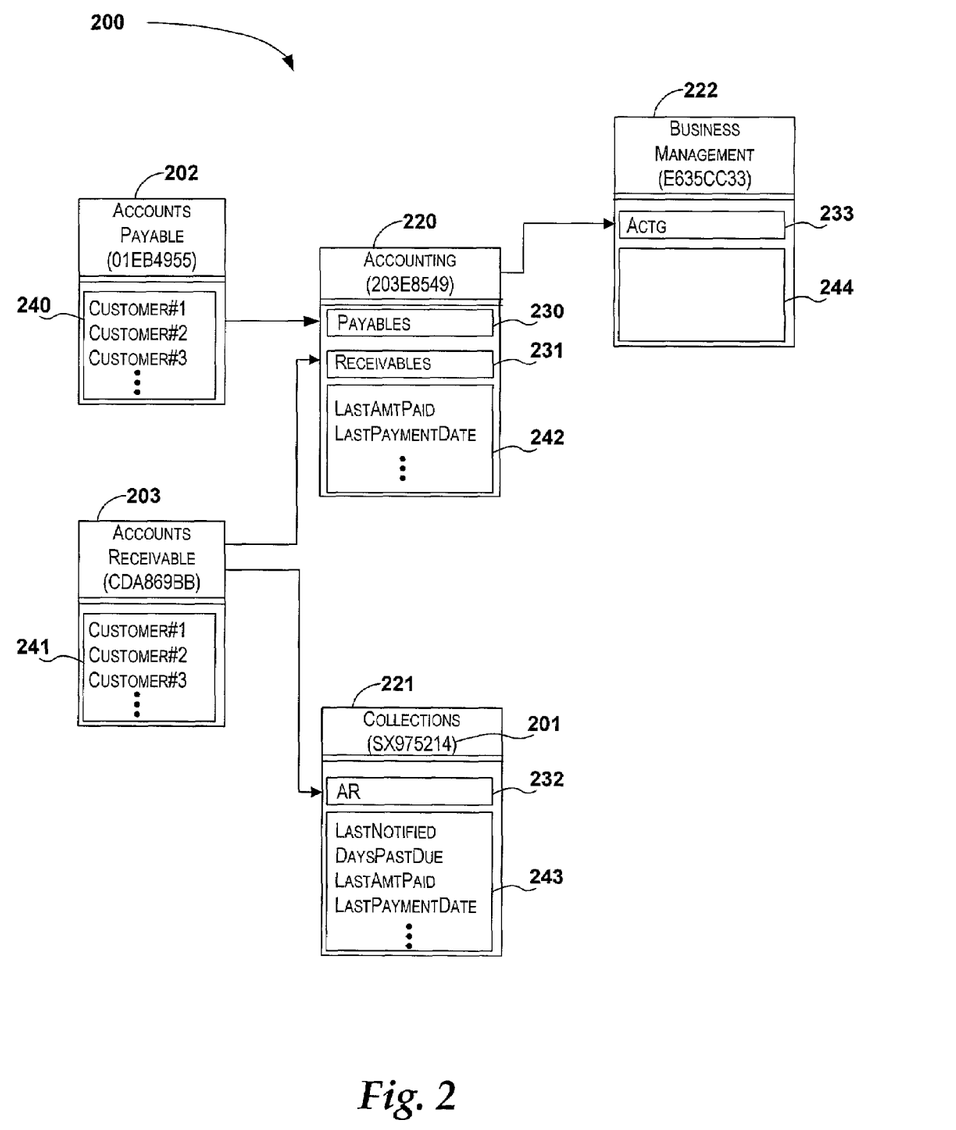
FIG. 2 graphically illustrates a namespace hierarchy in accordance with the present invention.

FIG. 2 graphically illustrates a namespace hierarchy 200 in accordance with the present invention. The namespace hierarchy 200 expands upon a standard named namespace in which names are declared for each declarative region. Briefly, as those skilled in the art will appreciate, a standard named namespace provides an area in which names are declared. The names declared in one standard named namespace typically do not conflict with identical names declared in other namespaces. A using declaration and a using directive could be used to selectively include another namespace or specific identifiers from the other namespace, respectively, into the namespace for the present scope. However, once the other namespace or specific identifiers were included, they existed in a flat namespace with all of the identifiers. As mentioned above, this flat namespace required the developers to create unique names for the identifiers, even the ones that were later included. Needless to say, this required developers to spend considerable time designing naming conventions and then applying the naming conventions consistently throughout the software program.

The namespace hierarchy 200 includes several namespaces (e.g., namespaces 202 and 203) each created in accordance with the present invention, which allows the namespaces to be imported in other namespaces, thereby creating a hierarchy of namespaces. The namespace hierarchy 200 includes root namespaces 202-203 and importing namespaces 220-222. Each of the root namespaces 202-203 and the importing namespaces 220-222 has an associated namespace identifier (NID) (e.g., NID 201 associated with the Collections namespace 221) that is globally unique. In addition, the root namespaces 202-203 and the importing namespaces 220-222 may reference local names in a globally unique manner by prefixing, or otherwise leveraging their respective namespace globally unique identifier.

Using the traditional "C" terminology for definition and declaration, once any of the root namespaces 202-203 or any of the importing namespaces 220-222 is published, the published namespace may be declared locally within another namespace. Thus, following the "C" terminology, a declaration is a reference to a definition. Any name having a local definition is referred to as a leaf name. For example, the "Accounts Payable" namespace 202 and the "Accounts Receivable" namespace 203 do not reference any other namespace, and thus are denoted as root namespaces. In contrast, the "Accounting" namespace 220, the "Collections" namespace 221, and the "Business Management" namespace 222 each locally declares another namespace, and are thus termed importing namespaces. As shown, importing namespaces may introduce new definitions 242-244 and may be declared (imported) into other namespaces (e.g., accounting namespace 220 is imported into business management namespace 222). As illustrated in FIG. 2, the namespace hierarchy 200 grows from the roots towards the leaves. In other words, a namespace importing another namespace may be defined at any time. However, adding a new export, declaration (import), or definition to an existing namespace may be allowed but is performed under greater scrutiny.

As will be discussed in further detail later in conjunction with FIGS. 3 and 4, one namespace may be declared locally within another namespace through the use of unique identifier (e.g., NID 201) and also by the namespace's defined common name. For any namespace that is declared locally, the importing namespace may assign a local name to the imported namespace. The local name is assigned in conjunction with the unique identifier, and accordingly objects referred to in the imported namespace are distinguishable from local declarations. The local name may then be used to reference names from the imported namespace within the importing namespace. This allows a developer to use a local name that has significantly more human-readable value than simply the unique identifier, while maintaining the uniqueness associated with the unique identifier.

Figure 3:
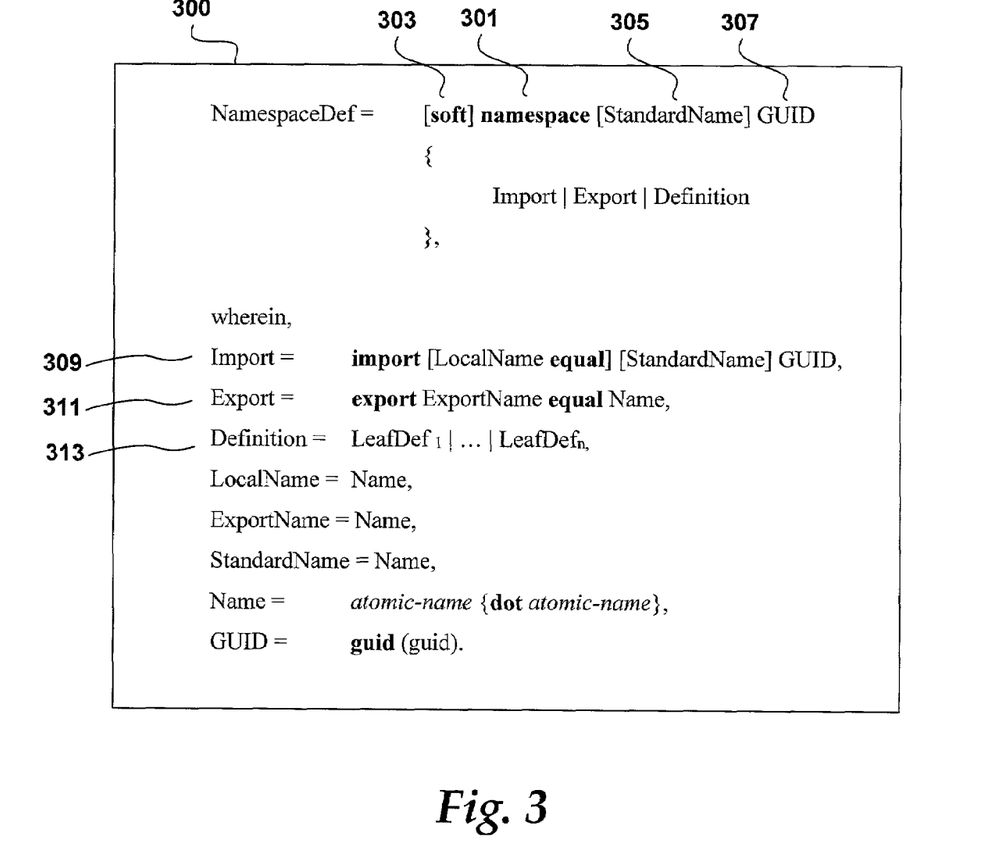
FIG. 3 illustrates an exemplary syntax for defining namespaces in accordance with the present invention.

FIG. 3 illustrates an exemplary syntax 300 for defining namespaces in accordance with the present invention. As shown in FIG. 3, the bold names for elements denote that the actual element name is used when defining the namespace. For example, the bolded element "namespace" within the namespace definition field 301 indicates that the word "namespace" is used in the actual declaration. The elements that appear without bold type denote elements for which a developer may create an arbitrary name or one that suits a particular situation. The brackets indicate optional elements.

In general, in the above exemplary syntax 300, the optional "soft" element 303 may generally be used during prototyping. A namespace that is declared "soft" may have changes made to the namespace at build time or at run-time. This is in contrast to a namespace that is published (e.g., declared without the soft element 303). In accordance with this particular implementation of the invention, once a namespace is published, the namespace is immutable. New names may be added to the published namespace, but names may not be removed. However, names in the published namespace may be removed from further new uses by adding a "deprecated" clause. Because namespaces that are declared "soft" may undergo changes and modifications, the number of namespaces that may reference the soft namespace is typically limited and under control of a single development organization.

The optional "StandardName" element 305 allows a developer to assign a conventional or common name for the namespace. The use of the StandardName attempts to encourage developers to use the same readable name for the same logical namespace whenever possible and practical. Thus, if the optional "StandardName" element is present, the reference to the standard name in an import clause must match the "StandardName" defined in its definition.

The "GUID" element 307 includes the term "guid" along with a namespace identifier (NID). As mentioned above, the namespace identifier is a globally unique identifier for the namespace. The globally unique identifier may be generated using any number of well known methods, such as Uniform Resource Identifiers (URIs) as used in XML namespaces, a GUID as used in COM, a strong name that is structured as four-tuples as used in the NET framework, or the like.

The "import" element 309 includes the word "import" along with an optional developer-created local name declaration and an equal sign. The local name allows the developer to assign a name that makes sense to the human reader in the context of the scope of the importing namespace. If the imported namespace has a StandardName defined for it, the StandardName is entered as a parameter to the import statement. The "import" element also includes the GUID for the imported namespace as described above.

The "export" element 311 includes the word "export" along with a developer created exportName and an equal sign followed by the local name of the definition or declaration to be exported. The "definition" element 313 defines other classes, attributes and the like associated with the namespace being declared. In addition, in accordance with the present invention, an imported item may be re-exported under a new name.

Figure 4:
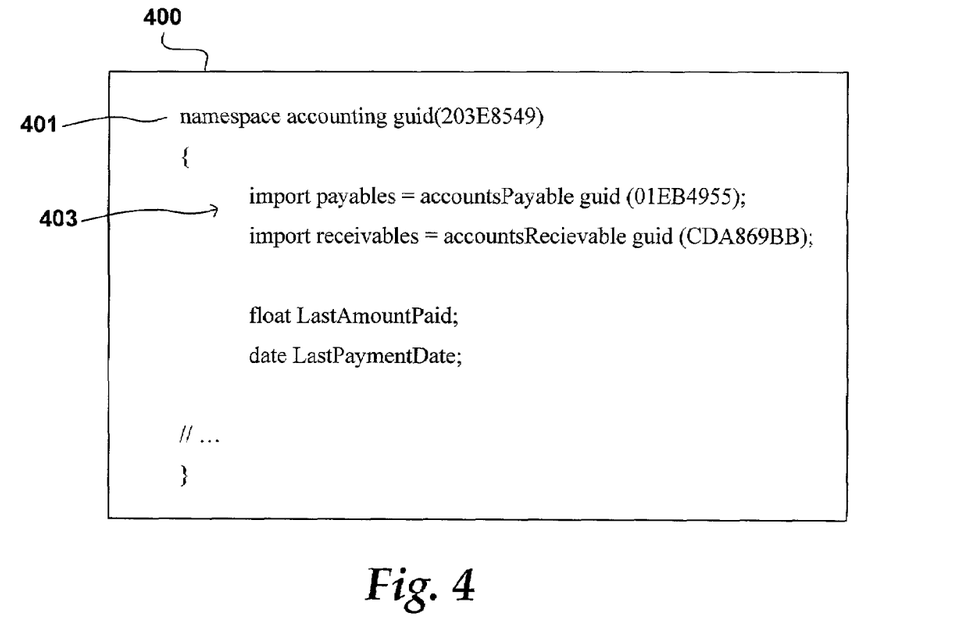
FIG. 4 illustrates an exemplary namespace definition for use in declaring a namespace shown in FIG. 2.

FIG. 4, in conjunction with FIG. 3, illustrate an exemplary importing namespace definition 400, such as for the accounting namespace 220 shown in FIG. 2. As discussed above, because accounting namespace 220 imports other namespaces, accounting namespace 220 may also be referred to as an importing namespace. Note that a namespace definition element 401 declares the standard name of the namespace to be "accounting" with a GUID of "203E8549." Those skilled in the art will appreciate that an actual GUID may be significantly longer and more complex than this illustrative GUID. For example, a GUID formatted in accordance with COM GUID conventions may appear as "{83825FC6-1792-41f4-93CA-94010AFC64D0}."

Two import elements 403 illustrate the use of other namespaces within an importing namespace. In this example, the accountsPayable namespace and the accounts Receivable namespace are imported and locally renamed to payables and receivables, respectively. Note again that the imported namespaces are also more specifically identified by their respective GUIDs, which ensures that naming collisions are avoided. There are no references to the location of the source units within a build system and no other incidental dependencies on source units. In one embodiment, each of the GUIDs associated with the namespaces are stored in a registry. For this embodiment, the build system would access the registry to determine the dependencies if necessary. Note that both of the imported namespaces have an alias that is much shorter than the name of the namespace.

Figure 5:
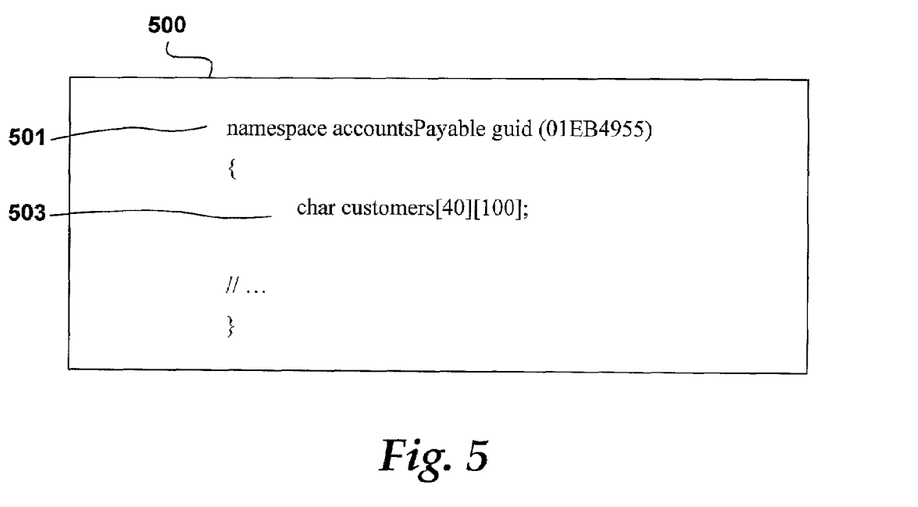
FIG. 5 illustrates another exemplary namespace definition for use in declaring a namespace shown in FIG. 2.

FIG. 5, in conjunction with FIG. 3, illustrate an exemplary root namespace definition 500, such as the accountsPayable root namespace 202 shown in FIG. 2. Note that the namespace definition 500 includes a definition element 501 identifying the standard name and GUID of the accountsPayable namespace 202. In addition, the namespace definition 500 declares a character array with a readable name "characters" 503. However, as explained above, the accountsPayable namespace 202 is a root namespace because it does not import any other namespaces.

Referring now to the namespace definitions illustrated in both FIG. 4 and FIG. 5, the character array of customers 503 may be referenced in one of two ways within the accounting namespace as defined by the accounting namespace definition 400. One is by using the identifier for the array as declared by the accountsPayable namespace definition 500 (e.g., customers[0]). The other way is by using a combination of the identifier for the namespace as declared in the accounting namespace definition 400 together with a relative readable path that leads to the definition, such as payables customers[0]. It will be appreciated that by using the relative readable path, the designer both creates an unambiguous reference to the customers array as declared in the accountsPayable namespace definition 500, while maintaining a reader-friendly name.

Namespace hierarchies in accordance with the present invention provide many advantages over other namespace designs. For example, the technique of the present invention provides a convenient way to determine the source of a name. If the namespace associated with the source of the name is unknown, that namespace may be conveniently retrieved and studied. In contrast, in C for example, namespaces are included into a flat naming universe that does not provide any indication of the source of a name. This makes reading code very difficult.

In another example, the naming technique of the present invention allows multiple namespace hierarchies to be created rather than enforcing one hierarchy. The present invention allows grouping names into namespaces and then assigning a unique identifier to that grouping. For instance, returning briefly to FIG. 2, the Accounts Receivable namespace 203 is part of at least two namespace hierarchies-a hierarchy that includes the Business Management namespace 222 and the Accounting namespace 220, and a hierarchy that includes only the Collections namespace 221. Accordingly, depending on the developer's needs, the objects declared in the Accounts Receivable namespace 203 may be accessed through either hierarchy. Namespace designs that require agreement on one "right" hierarchy demand an almost unachievable goal. In contrast, the technique of the present invention allows source units to be moved without affecting the resolution of external references. A namespace may be defined for one source unit and changed very easily by redirecting the references from one subtree to another.

In yet another example, the naming technique of the present invention provides a convenient and unobtrusive migration path from legacy or standard-named namespaces, such as those currently defined by C++, to a namespace hierarchy in accordance with the present invention. When converting from legacy namespaces, a GUID is added to each standard named namespace to generate a root namespace in accordance with the present invention. This may be done at any time. Even after the "old" standard named namespace has been converted, the "old" namespace may remain available for use in the "old" manner as long as needed. Thus, the present invention does not interfere with existing implementations.

In still another example, the migration of standard or legacy namespaces to namespace hierarchies in accordance with the present invention may involve "helper namespaces" that import the newly defined namespaces and re-export their leaf definitions in a manner that reflects the reorganization of the old namespaces. Then, any existing source code may be redirected to the new "helper namespaces" by importing the new "helper namespaces" and referencing the associated GUID. In addition, the existing source code may later be modified to remove the "helper namespaces". The namespace hierarchies may also be conveniently modified to accommodate semantic changes to leaf definitions and reorganization of the namespace hierarchy.

In still another example, the import/export mechanism of the present invention allows the creation of arbitrary parallel namespace hierarchies that reflect multiple taxonomies. The imports may use local names to resolve any conflicts that may arise from collisions with recommended names. At any point of reference, the namespace hierarchies are anchored in a root GUID. It is desirable for the root GUID to be expanded to easily and conveniently illustrate the corresponding definition for the namespace. In one embodiment, it is envisioned that the GUID may be stored in a commonly accessible location, such as a system registry. The development tools for editing, debugging and browsing may then reference the GUID in the commonly accessible location to obtain its definition.

In still another example, because the namespace hierarchy has an associated GUID, the namespace is uniquely identified. In one implementation, it is envisioned that namespaces will not be removed from another namespace hierarchy once the namespace has been published. However, new names may be added to the published namespace. Existing names will not be removed. The use of a name may be discontinued, or in other words deprecated. Once the name is discontinued, it may not be revived.

In yet another example, namespace hierarchies may be copied to make their definitions widely available. However, it is envisioned that there is one master copy of the namespace that is controlled by some authority. This authority is responsible for maintaining the master copy. The duration of the namespace may be indefinite or may have a defined expiration date or a defined non-use date. If the contract has a finite lifetime, the authority may be responsible for renegotiating or renewing the lifetime of the namespace.

Figure 6:
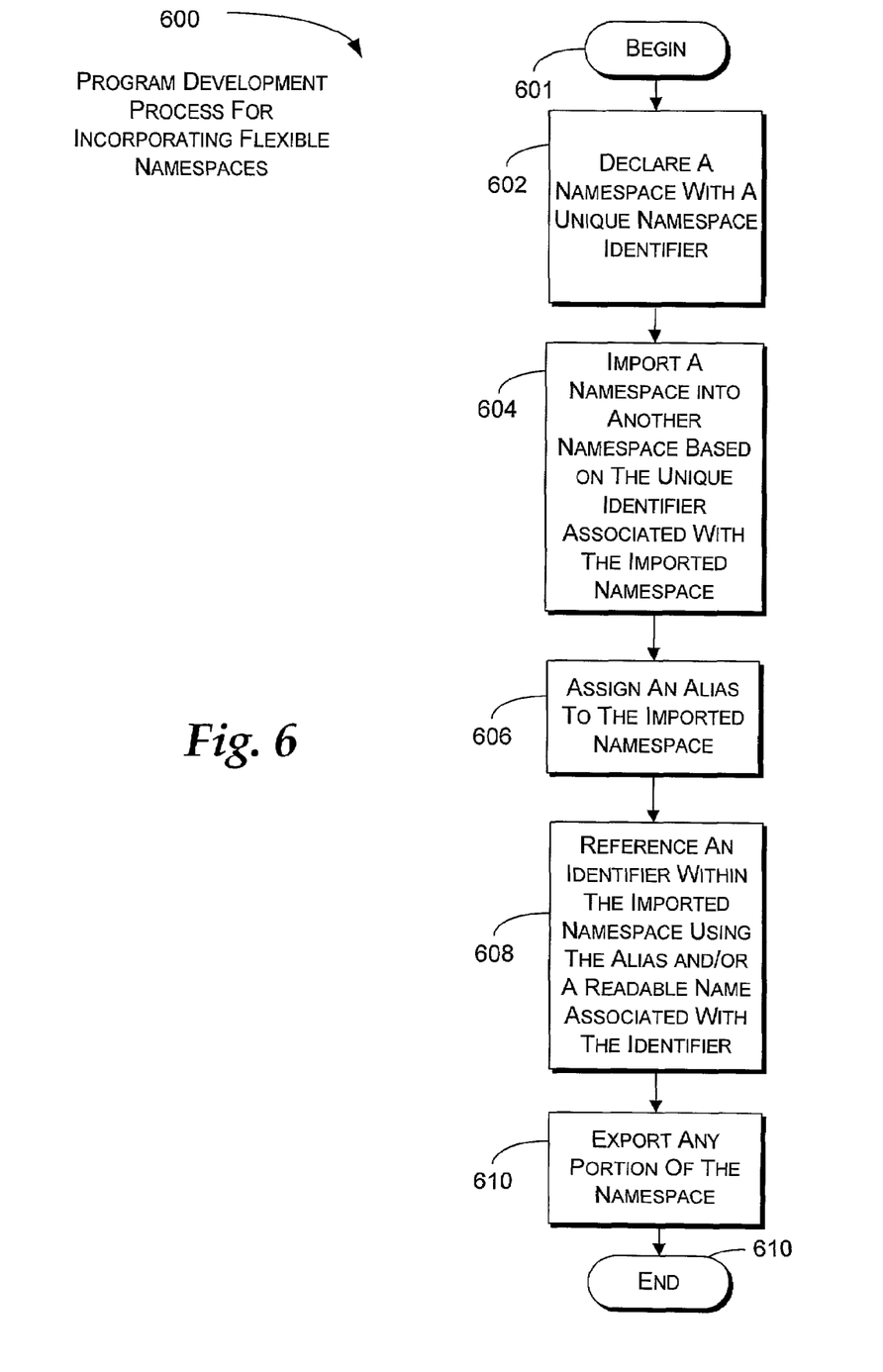
FIG. 6 is a logical flow diagram illustrating a program development process incorporating a flexible namespace in accordance with the present invention.

FIG. 6 is a logical flow diagram illustrating, in summary fashion, a program development process incorporating a flexible namespace in accordance with the present invention.

FIG. 6 illustrates one example of a scenario where the present invention may be a benefit over existing namespace naming techniques. The process 600 begins at block 601, where during a program development cycle or the execution of a software application invoke the use of namespaces constructed in accordance with the present invention. The process continues at block 602.

At block 602, a namespace is declared with a unique namespace identifier, such as a GUID, and a common or standard name. For example, referring briefly to FIG. 2, the Accounts Receivable namespace 203 has been declared by a common name "Accounts Receivable" and the unique identifier "CDA869BB."

At block 604, the namespace declared at block 602 is imported into a second namespace based on the unique identifier and the common name of the imported namespace. For example, referring again to FIG. 2, the Collections namespace 221 imports the Accounts Receivable namespace 203 into the scope of the Collections namespace 221.

At block 606, an alias or local name is assigned to the imported namespace. Continuing the above example, the Collections namespace 221 assigns a local name (AR) 232 that acts as an alias for the Accounts Receivable namespace 203 within the scope of the Collections namespace 221. The local name 232 is associated with the unique identifier assigned to the imported namespace, CDA869BB in this example.

At block 608, an application or other process references a declaration made within the imported namespace within the scope of the importing namespace using the alias or a readable name associated with the unique identifier for the imported namespace. In other words, continuing with the above example, an application or other process may interact with the Collections namespace 221 and access the customer array 241 within the Accounts Receivable namespace 203. For example, the customer array 241 may be accessed within the scope of the Collections namespace 221 by referring to the alias AR in combination with a description of the customer array 241 (e.g., AR.customers[0]). It should by now be apparent that referring to the declarations within the imported namespace using the alias or local name avoids name collisions with other declarations made within the importing namespace.

At block 610, optionally, all or a portion of the imported namespace may be exported for use by other namespaces. For example, referring again to FIG. 2, the Accounting namespace 220 may export itself and all or a portion of the Accounts receivable namespace 203, thereby creating a namespace hierarchy including those namespaces. It should also by now be apparent that this feature enables the creation of namespace hierarchies forming a tree or graph structure, which have not been possible with the flat namespaces known until now.

The above specification, examples and data provide a complete description of the manufacture and use of the composition of the invention. Even though the above specification and examples focused on the use of namespace hierarchies in a C/C++ environment, those skilled in the art will appreciate that the teaching of the present invention may be applied to other environments, such as .NET, XML, without undue experimentation. Therefore, because many embodiments of the invention can be made without departing from the spirit and scope of the invention, the invention resides in the claims hereinafter appended.

I claim:

1. A computer-implemented method for allowing a namespace to be made available to a second namespace without creating name collisions with the second namespace during a build process and at run-time while providing readable names within the first and second namespaces, the method comprising:

declaring a first namespace with a globally unique namespace identifier, wherein the globally unique namespace identifier is maintained in association with the first namespace to identify the first namespace when importing the first namespace into a second namespace;

declaring the first namespace with a first localized common name and a plurality of declarations, wherein the first localized name is modifiable to provide localized naming of the first namespace in the second namespace when the first namespace is imported into the second namespace;

importing the first namespace into the second namespace, wherein the globally unique namespace identifier is maintained during importing to uniquely identify the first namespace and the plurality of declarations, wherein the first localized common name is modified to a second localized common name to provide local naming of the first namespace in the second namespace;

referring to the second localized common name within the second namespace;

identifying the first namespace from the globally unique identifier, and accessing a declaration within the plurality of declarations in the first namespace within the scope of the second namespace by reference to the second localized common name.

2. The computer-implemented method of claim 1, wherein the second localized common name for the first namespace comprises the first localized cannon name.

3. The computer-implemented method of claim 1, wherein the second localized common name for the first namespace comprises an alias assigned to the first namespace.

4. The computer-implemented method of claim 1, wherein the first namespace includes a first definition data field for the first namespace having an element configured to indicate that the first namespace is changeable.

5. The computer-implemented method of claim 1, wherein the second namespace includes a second definition data field defining the second namespace, and an import data field including a first localized name field configured to receive the first localized name and to identify the first namespace for import into the second namespace, the import data field being configured to identify the first namespace by the first localized name and the globally unique identifier.

6. The computer-implemented method of claim 5, wherein the second namespace definition data field further comprises an export data field including an atomic name by which at least a portion of the second namespace is published for use by other computer-executable components.

7. The computer-implemented method of claim 5, wherein the import data field further comprises a local name declaration that assigns the second localized name to the first namespace within the scope of the second namespace.

8. The computer-implemented method of claim 7, wherein a declaration made in The first namespace is accessible in the scope of the second namespace by reference to the second localized name assigned to the first namespace.

9. The computer-implemented method of claim 8, wherein a conflict between the first localized name associated with the first namespace and a declaration made in the second namespace is resolved with reference to the globally unique identifier.

10. A computer-readable storage medium having computer-executable instructions for allowing a namespace to be made available to a second namespace without creating name collisions, the instructions comprising:

declaring the first namespace with a globally unique identifier, wherein the globally unique namespace identifier uniquely identifies the first namespace when importing the first namespace, wherein the globally unique identifier is maintained in association with the first namespace during a build process;

declaring the first namespace with a first localized common name, wherein the first localized name is modifiable to provide localized naming of the first namespace when the first namespace is imported into a second namespace;

importing the first namespace into the second namespace, wherein the globally unique namespace identifier is maintained during importing to uniquely identify the first namespace, wherein the fits localized common name is modified to a second localized common name to provide local naming of the first namespace in the second namespace;

referring to the second localized common name within the second namespace;

identifying the first namespace from the globally unique identifier; and accessing a declaration associated with the first namespace within the scope of the second namespace by reference to the second localized common name.

11. The computer-readable storage medium of claim 10, wherein the second localized common name for the first namespace comprises the first localized common name.

12. The computer-readable storage medium of claim 10, wherein the second localized common name for the first namespace comprises an alias assigned to the first namespace.

13. The computer-readable storage medium of claim 10, wherein the first namespace includes a first definition data field for the first namespace having an element configured to indicate that the first namespace is changeable.

14. The computer-readable storage medium of claim 10, wherein the second namespace includes a second definition data field defining the second namespace, and an import data field including a first localized name field configured to receive the first localized name and to identify the first namespace for import into the second namespace, the import data field being configured to identify the first namespace by the first localized name and the globally unique identifier.

15. The computer-readable storage medium of claim 14, wherein the second namespace definition data field further comprises an export data field including an atomic name by which at least a portion of the second namespace is published for use by other computer-executable components.

16. The computer-readable storage medium of claim 14, wherein the import data field further comprises a local name declaration that assigns the second localized name to the first namespace within the scope of the second namespace.

17. The computer-readable storage medium of claim 16, wherein a declaration made in the first namespace is accessible in the scope of the second namespace by reference to the second localized name assigned to the first namespace.

18. The computer-readable storage medium of claim 17, wherein a conflict between the first localized name associated with the first namespace and a declaration made in the second namespace is resolved with reference to the globally unique identifier.

19. A system for allowing a namespace to be made available to a second namespace without creating name collisions, the system comprising:
- a processor, and
- a memory having computer-executable instructions associated therewith, the instructions comprising:
  - declaring the first namespace with a globally unique identifier, wherein the globally unique namespace identifier uniquely identifies the first namespace when importing the first namespace, wherein the globally unique identifier is maintained in association with the first namespace during a build process;
  - declaring the first namespace with a first localized common name, wherein the first localized name is modifiable to provide localized naming of the first namespace when the first namespace is imported into a second namespace;
  - importing the first namespace into the second namespace, wherein the globally unique namespace identifier is maintained during importing to uniquely identify the first namespace, wherein die first localized common name is modified to a second localized common name to provide local naming of the first namespace in the second namespace;
  - referring to the second localized common name within the second namespace;
  - identifying the first namespace from the globally unique identifier; and
  - accessing a declaration associated with the first namespace within the scope of the second namespace by reference to the second localized common name.

20. The system of claim 19, wherein second localized common name for the first namespace includes at least one member from a group comprising: the first localized common name and an alias assigned to the first namespace.

* * * * *